United States Patent [19]

Beebe

[11] 4,139,212
[45] Feb. 13, 1979

[54] COLLAPSIBLE BUMPER HITCH APPARATUS

[76] Inventor: Dean L. Beebe, Minneola, Kans. 67865

[21] Appl. No.: 845,292

[22] Filed: Oct. 25, 1977

[51] Int. Cl.² ............................................... B60D 1/00
[52] U.S. Cl. ............................................... 280/491 D
[58] Field of Search ................ 280/491 R, 491 D, 412

[56] References Cited

U.S. PATENT DOCUMENTS

| 2,995,386 | 8/1961 | Peterson | 280/491 D |
|---|---|---|---|
| 3,666,121 | 5/1972 | Denner | 280/491 D |
| 3,704,900 | 12/1972 | Geber | 280/491 D |
| 4,013,303 | 3/1977 | Milner | 280/491 D |

Primary Examiner—Joseph F. Peters, Jr.
Assistant Examiner—R. Schrecengost
Attorney, Agent, or Firm—Phillip A. Rein

[57] ABSTRACT

This invention is a collapsible bumper hitch apparatus that is readily attachable to a bumper of a vehicle movable from a collapsed, folded, storage condition to an extended condition connectable to a trailer hitch ball member. The collapsible bumper hitch apparatus includes a hitch assembly pivotally connected to a bumper frame by a connector means. The hitch assembly includes first and second hitch arm assemblies, each having one end pivotally connected to the connector means and the other outer ends connectable to each other. The first and second hitch arm assemblies are movable into overlapping positions above the bumper member for storage purposes.

10 Claims, 8 Drawing Figures

COLLAPSIBLE BUMPER HITCH APPARATUS

PRIOR ART

Numerous trailer hitch patents are noted in the prior art attachable to a bumper structure on a vehicle such as the following:

U.S. Pat. No. 3,147,027
U.S. Pat. No. 2,440,877
U.S. Pat. No. 3,181,893
U.S. Pat. No. 2,139,970
U.S. Pat. No. 2,601,992
U.S. Pat. No. 3,419,285

The Morehouse, et al. and Bronleewe patents teach collapsible towing hitch structures but are substantially different in operation and structure relative to applicant's bumper hitch apparatus as described herein.

PREFERRED EMBODIMENT OF THE INVENTION

In one preferred embodiment of this invention, a collapsible bumper hitch apparatus is provided that is connectable to the front bumper area of a vehicle. The collapsible bumper hitch apparatus includes a hitch assembly pivotally connected to a support frame of the vehicle by a connector means. The hitch assembly includes a first hitch arm assembly and a second hitch arm assembly, each having outer ends pivotally connected to a portion of the connector means and inner ends that are connectable to each other to form a hitch yoke. The first hitch arm assembly includes a hitch support arm; a hitch ball connector assembly secured to the inner ends of the hitch support arm; and an anchor assembly connected to the hitch ball connector assembly. The second hitch arm assembly includes a hitch support arm member having the inner end connected to the anchor assembly when in the extended usage position. The first hitch arm assembly is movable to a position over the bumper member and the second hitch arm assembly in a collapsed condition for purposes of storage and conveyance. The anchor assembly is connected to an anchor plate on the second hitch arm assembly in the collapsed condition.

OBJECTS OF THE INVENTION

One object of this invention is to provide a collapsible bumper hitch apparatus that is readily mounted on existing vehicles; easy to operate, and sturdy in construction.

Another object of this invention is to provide a collapsible bumper hitch apparatus that is movable from a fully extended hitch yoke position to a folded, collapsed storage condition positioned adjacent and above the front bumper on a vehicle.

One further object of this invention is to provide a collapsible bumper hitch apparatus mounted on a vehicle that is easily moved from a storage condition to the extended position for connection to a trailer hitch ball for towing the subject vehicle.

Various other objects, advantages, and features of the invention will become apparent to those skilled in the art from the following discussion, taken in conjunction with the accompanying drawings, in which:

FIGURES OF THE INVENTION

FIG. 6 is a fragmentary sectional view taken along line 6—6 in FIG. 4;

FIG. 7 is a fragmentary sectional view taken along line 7—7 in FIG. 4; and

FIG. 8 is a fragmentary sectional view taken along line 8—8 in FIG. 2.

Figure 1:
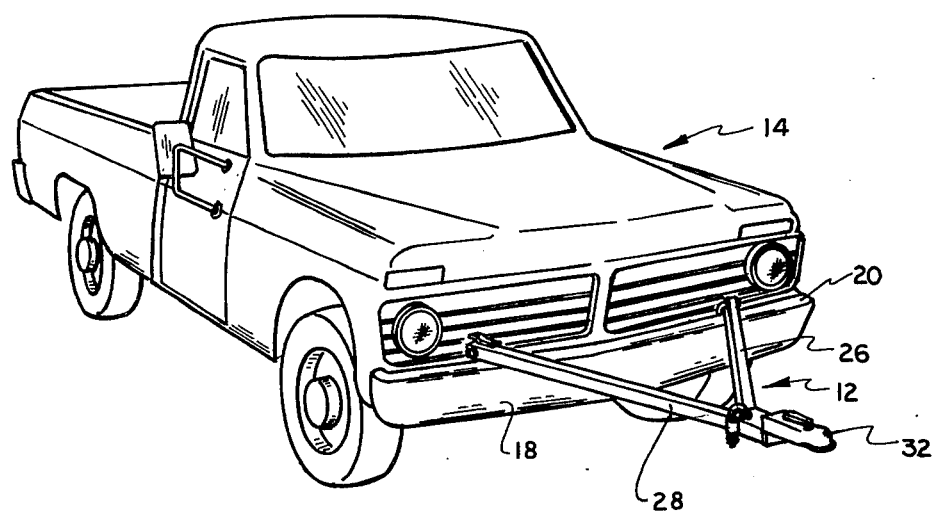
FIG. 1 is a perspective view of a pick-up truck vehicle having a collapsible bumper hitch apparatus of this invention connected thereto.

The following is a discussion and description of preferred specific embodiments of the new collapsible bumper hitch apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, more particularly to FIG. 1, a collapsible bumper hitch apparatus, indicated generally at 12, is shown as connected to a pick-up truck vehicle 14. More particularly, the truck vehicle 14 has a pair of spaced, frame members 16, 17 operable to support a front bumper member 18 therebetween. The frame members 16, 17 are of channel steel construction. The front bumper member 18 is of a conventional shape and size having a top surface 20 to support a portion of the collapsible bumper hitch apparatus 12 as will be explained.

The collapsible bumper hitch apparatus 12 includes a hitch assembly 22 connected to the frame members 16, 17 of the truck vehicle 14 by a connector means 24. The hitch assembly 22 includes a first hitch arm assembly 26 releasably connectable to a second hitch arm assembly 28.

Figure 3:
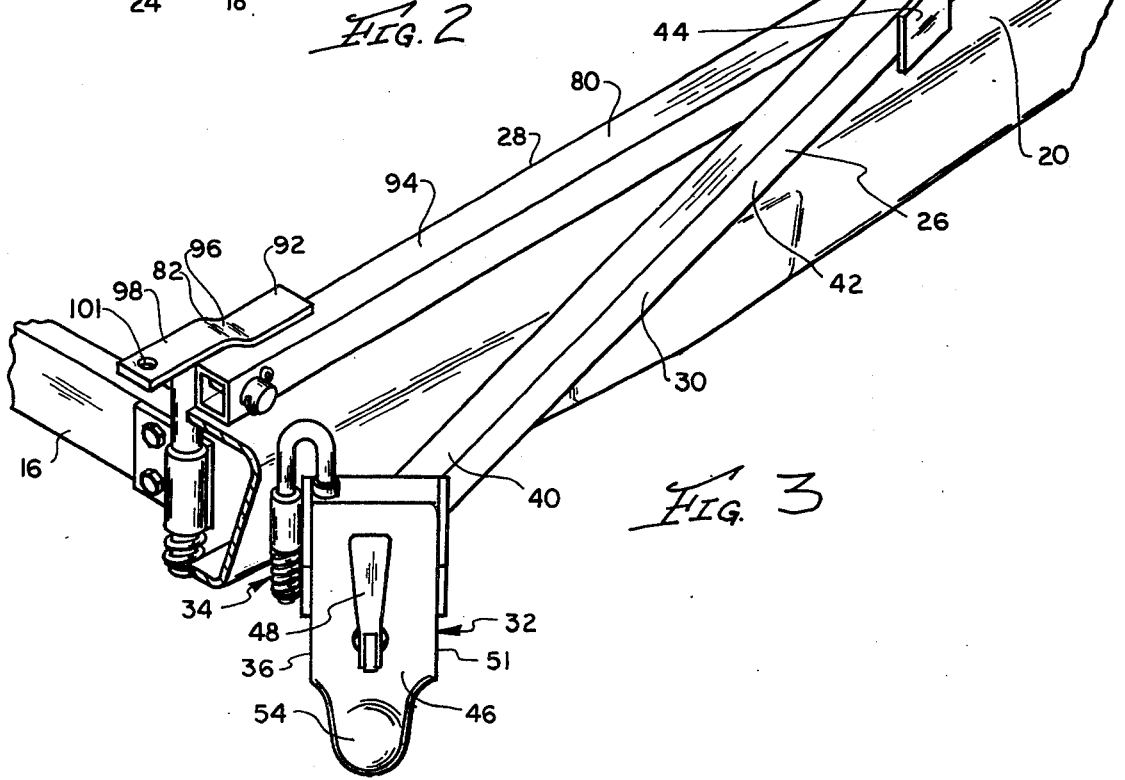
FIG. 3 is an enlarged, fragmentary perspective view of the collapsible bumper hitch apparatus of this invention being close to a collpased, storage condition.
Figure 4:
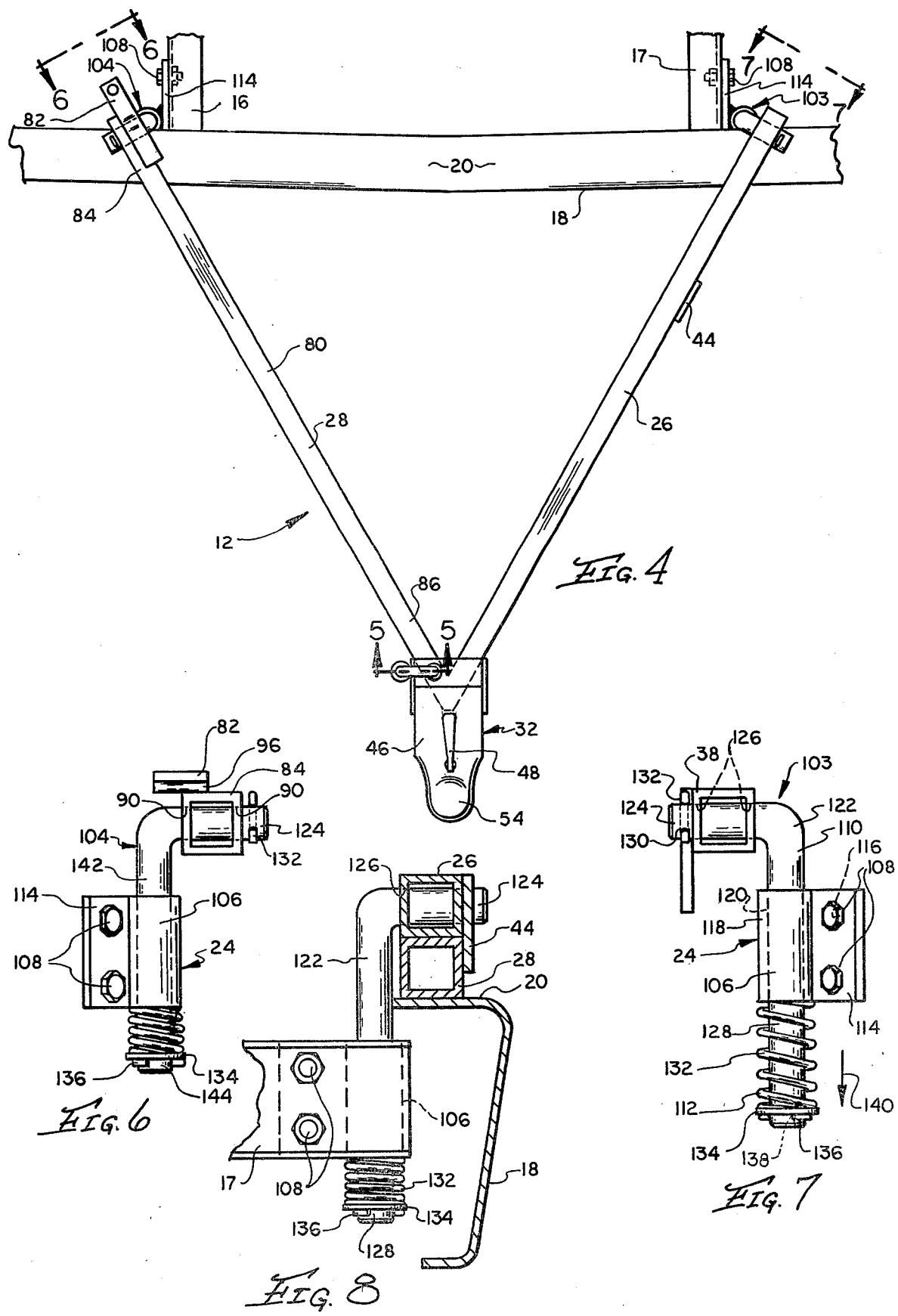
FIG. 4 is a top plan view of the collapsible bumper hitch apparatus of this invention shown as connected to the front bumper member.

As best shown in FIGS. 3 and 4, the first hitch arm assembly 26 includes an elongated hitch support arm 30; a connector assembly 32 secured to an outer end of the hitch support arm 30; and an anchor assembly 34 secured to one sidewall 36 of the connector assembly 32. The hitch support arm 30 is of square tubular shape in transverse cross section having an anchor end portion 38 at one end and a connector end portion 40 at the opposite end. An outer vertical sidewall 42 supports a downwardly depending retainer or stop place 44 for reasons to be explained.

The connector assembly 32 resembles a standard hitch apparatus having a ball connector housing 46 with an actuator lever 48 connected thereto. The ball connector housing 46 has a top wall 50 integral with spaced parallel sidewalls 36, 51; a bottom wall 52; and a ball receiver cavity 54. The actuator lever 48 is operable in a conventional manner to receive and clamp a hitch ball mounted on a second vehicle in the ball receiver cavity 54.

The connector assembly 32 can be a pair of spaced, parallel plate members having aligned vertical holes therein. Then, the connector assembly 32 is easily connected to a clevis and lock pin found on three point hitches on the rear of tractors. A farmer can trail the pick-up truck behind the tractor.

Figure 5:
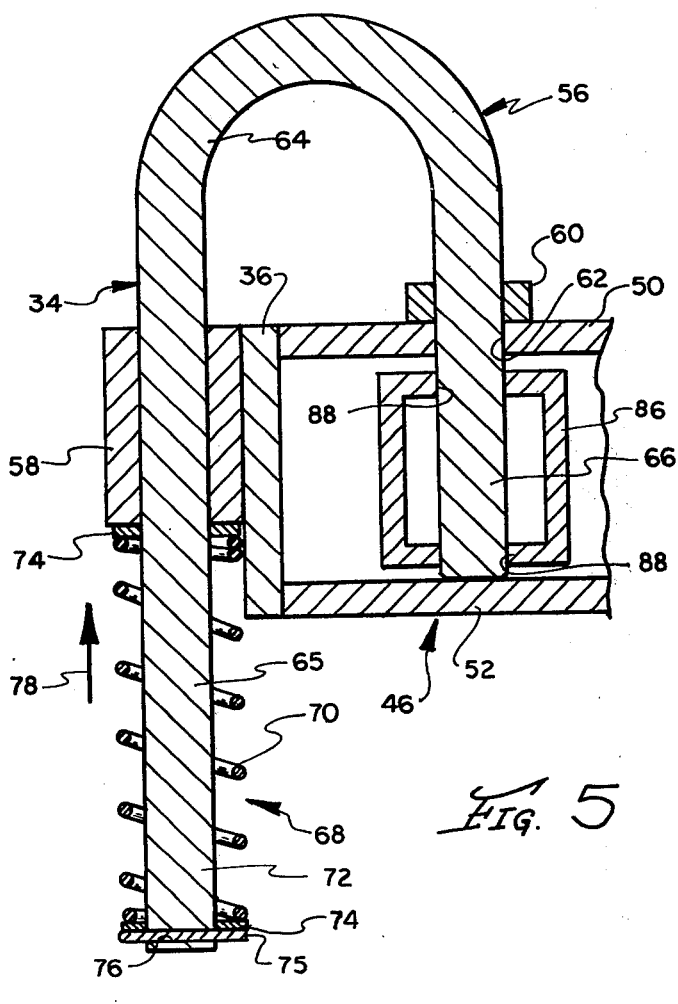
FIG. 5 is an enlarged fragmentary sectional view taken along line 5—5 in FIG. 4.

As best shown in FIG. 5, the anchor assembly 34 includes a main lock assembly 56 mounted in a cylindrical housing member 58 and engagable with a guide collar 60 secured to the top wall 50 of the ball connector housing 46. The cylindrical housing member 58 has a vertical axis and is secured as by welding to the sidewall 36. The guide collar 60 is an open ended cylinder welded to the top wall 50 about a hole 62 therein.

The main lock assembly 56 includes a J-shaped lock rod 64 having a long leg 65 extended through the cylindrical housing member 58 and a short leg 66 selectively mounted in the guide collar 60. The lock rod 64 is of a snug, axially movable relationship with the housing member 58 and the guide collar 60.

The lock assembly 56 further includes a lock biasing assembly 68 having a compression spring member 70 mounted about a lower section 72 of the long leg 65 of the lock rod 64 and held thereon between two washers 74 and by a cotter pin 75. The lock rod 64 has a hole 76 at the lowest end of the lower section 72 to receive the cotter pin 75. The lock rod 64 can be moved vertically as shown by arrow 78 to compress the spring member 70 and free the short leg 66 from the guide collar 60 in locking to the second hitch arm assembly 28 as will be explained.

As seen in FIGS. 4 and 6, the second hitch arm assembly 28 includes a hitch support arm member 80 having an anchor plate 82 secured to an anchor end portion 84 of the hitch support arm member 80. The hitch support arm member 80 is of a square tubular shape in transverse cross section having the outer end formed with a connector end portion 86.

The connector end portion 86 is formed with spaced, vertically aligned holes 88 to selectively receive the short leg 66 of the lock rod 64 therethrough (FIG. 5). Similarly, the anchor end portion 84 has horizontally aligned holes 90 to receive a portion of the connector means 24 therein.

The anchor plate 82 resembles a stepped strap member having (1) a connector section 92 secured to a top wall 94 of the hitch support arm member 80; (2) a stepped mid-section 96 integral with one end of the connector section 92; and (3) an anchor section 98 integral with the other end of the mid-section 96. The anchor section 98 is formed with a lock hole 101 to selectively receive the short leg 66 of the lock rod 64 in a manner to be explained.

As best shown collectively in FIGS. 6, 7, and 8, the connector means 24 includes (1) a first hitch connector assembly 103 operable to connect the first hitch arm assembly 26 to the frame member 17; and (2) a second hitch connector assembly 104 operable to connect the second hitch arm assembly 28 to the frame member 16.

As seen in FIG. 7, the first hitch connector assembly 103 includes (1) an anchor plate assembly 106 secured by nut and bolt members 108 to the frame member 17; (2) a connector post assembly 110 slidably mounted in the anchor plate assembly 106; and (3) a biasing member 112 operably connected to the connector post assembly 110 and the anchor plate assembly 106.

The anchor plate assembly 106 includes a rectangular shaped plate member 114 having holes 116 to receive the nut and bolt members 108 and a support cylinder 118 welded to the plate member 114. The support cylinder 118 has a vertically extended opening 120 therein.

The connector post assembly 110 includes a first connector rod 122 of L-shape having (1) a short leg portion 124 extended through aligned holes 126 in the anchor end portion 38 of the hitch support arm 30; and (2) a long leg portion 128 extended through the opening 120 in the support cylinder 118. An outer end of the short leg portion 124 has a hole 130 to receive a cotter pin 132 therein to restrict lateral movement of the hitch support arm 30.

The biasing member 112 is a compression spring member 132 mounted about the long leg portion 128 and held between the support cylinder 118 and a washer member 134 by a cotter pin 136 mounted in a hole 138 in the lower end of the long leg portion 128. It is obviously noted that the spring member 132 biases the connector rod 122 and interconnected hitch support arm 30 downwardly as shown by arrow 140 in FIG. 7.

As shown in FIG. 6, the second hitch connector assembly 104 is substantially identical to the above first hitch connector assembly 103 except for description of a second connector rod 142 having a long leg 144 which is shorter than the long leg portion 128 of the first connector rod 122. The same short leg portion 124 is mounted in aligned holes 90 in the anchor end portion 84 of the hitch support arm member 80. The same biasing member 112 and anchor plate assembly 106 is utilized.

The long leg portion 128 is longer than the long leg 144 to allow for overlapping of the first hitch arm assembly 26 and the second hitch arm assembly 28 in the collapsed storage condition as shown in FIG. 8.

USE AND OPERATION OF THE INVENTION

Figure 2:
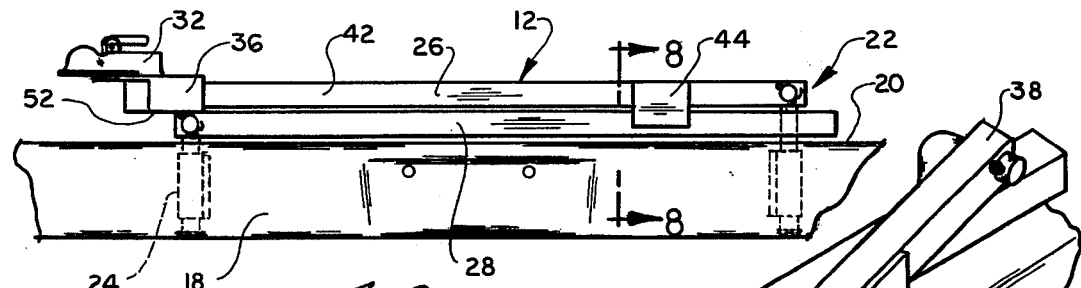
FIG. 2 is a front fragmentary elevational view of a front bumper member having the collapsible bumper hitch apparatus of this invention connected thereto.

The collapsible bumper hitch apparatus of this invention is normally carried in the non-use storage condition as shown in FIG. 2. To achieve this condition, the second hitch arm assembly 28 is moved inwardly to a position parallel to the front bumper member 18 and against the top surface 20.

Next, the first hitch arm assembly 26 is pivoted inwardly to a position overlying the second hitch arm assembly 28. (Such step shown in process in FIG. 3.) The lock rod 64 is pulled upwardly from that shown in FIG. 5 so that the short leg 66 is free of the guide collar 60. The lock rod 64 is then rotated to place the short leg 66 in axial alignment with the lock hole 101 in the anchor plate 82. The lock rod 64 is then lowered and, with aid of the compression spring member 70, the short leg 66 is inserted in the lock hole 101 to anchor the collapsible bumper hitch apparatus 12 in the transport or storage condition as shown in FIG. 2. It is seen that the retainer plate 44 cooperates with the long leg portion 128 of the first connector rod 122 to hold the second hitch arm assembly 28 in the storage condition.

As seen in FIG. 8, the long leg portion 128 is extended upwardly to compress the spring member 132 which also aids in clamping the second hitch arm assembly 28 against the top surface 20 of the bumper member 18.

In order to move the collapsible bumper hitch apparatus 12 from the position of FIG. 2 to the usage position as shown in FIGS. 1 and 4, the lock rod 64 is moved upwardly to free same from the lock hole 101 in the anchor plate 82. The first hitch arm assembly 26 and the second hitch arm assembly 28 are pivoted about respective portions of the connector means 24. The connector end portion 86 of the second hitch arm assembly 28 is placed within the confines of the connector housing 46. The lock rod 64 is then lowered to place the short leg 66 through the guide collar 60 and aligned holes 88 in the connector end portion 86 of the hitch support arm member 80 (note FIG. 5).

In this position, the connector assembly 32 is readily connected to a standard hitch ball on another vehicle for towing purposes.

While the invention has been described in conjunction with preferred specific embodiments thereof, it will be understood that this description is intended to illustrate and not to limit the scope of the invention, which is defined by the following claims.

I claim:

1. A collapsible bumper hitch apparatus adapted to be connected to frame members on a vehicle adjacent to a bumper member, comprising:
   (a) a hitch assembly including a first hitch arm assembly having one end releasably connected to one end of a second hitch arm assembly;
   (b) a connector means to pivotally connect other ends of said first hitch arm assembly and said second hitch arm assembly to respective ones of the frame members on the vehicle;
   (c) said first hitch arm assembly on said one end having a connector assembly adapted to be connected to a connector member on a second vehicle and an anchor assembly connected to said connector assembly; and
   (d) said anchor assembly having a lock rod connected with said one end of said second hitch arm assembly when in the extended, towing position, and connected with said other end of said second hitch arm assembly when in the folded, storage positon above the bumper member.

2. A collapsible bumper hitch apparatus as described in claim 1, wherein:
   (a) said anchor assembly further including a cylindrical housing member secured to said connector assembly and having said lock rod movable axially therein and a lock biasing member engaged with said lock rod to urge same to a locked condition.

3. A collapsible bumper hitch apparatus as described in claim 2, wherein:
   (a) said lock rod is of a J-shape having a long leg integral with and parallel to a short leg; and
   (b) said short leg mounted through holes in said one end of said second hitch arm assembly in the extended, towing position.

4. A collapsible bumper hitch apparatus as described in claim 3, wherein:
   (a) said other end of said second hitch arm assembly having an anchor plate with a lock hole therein; and
   (b) said lock rod pivotal about said long leg to place said short leg in said lock hole in the folded, storage position.

5. A collapsible bumper hitch apparatus as described in claim 1, wherein:
   (a) said connector means including a first hitch connector assembly to pivotally connect said other end of said first hitch arm assembly to one of the frame members and a second hitch connector assembly to pivotally connect said other end of said second hitch arm assembly to the other one of the frame members.

6. A collapsible bumper hitch apparatus as described in claim 5, wherein:
   (a) said first hitch connector assembly including an anchor plate assembly secured to one of the frame members, an anchor rod pivotally mounted in said anchor plate assembly, and a biasing member mounted about said anchor rod to bias same and said first hitch arm assembly downwardly toward the bumper member in the folded condition.

7. A collapsible bumper hitch apparatus as described in claim 6, wherein:
   (a) said second hitch connector assembly including an anchor plate assembly secured to one of the frame members, an anchor rod pivotally mounted in said anchor plate assembly, and a biasing member mounted about said anchor rod to bias same and said second hitch arm assembly downwardly into contact with the bumper member in the folded condition.

8. A collapsible bumper hitch apparatus as described in claim 1, wherein:
   (a) said first hitch arm assembly having a downwardly depending stop plate; and
   (b) said stop plate engagable with second hitch arm assembly in the folded, storage position to prevent lateral movement thereof.

9. A collapsible bumper hitch apparatus as described in claim 1, wherein:
   (a) said first hitch arm assembly and said second hitch arm assembly each including a hitch support arm having an anchor end pivotally connected to said connector means and a connector end releasable connectable to each other; and
   (b) said hitch support arms of square shape in transverse cross section.

10. A collapsible bumper hitch apparatus as described in claim 9, wherein:
    (a) said anchor end of said second hitch arm assembly having a lock plate thereon with a lock hole therein; and
    (b) said lock rod engagable with said lock hole on said lock plate in the folded, storage position.

* * * * *